Oct. 27, 1953  R. L. SINK  2,657,352
BRIDGE CIRCUIT
Filed July 11, 1949  2 Sheets-Sheet 1
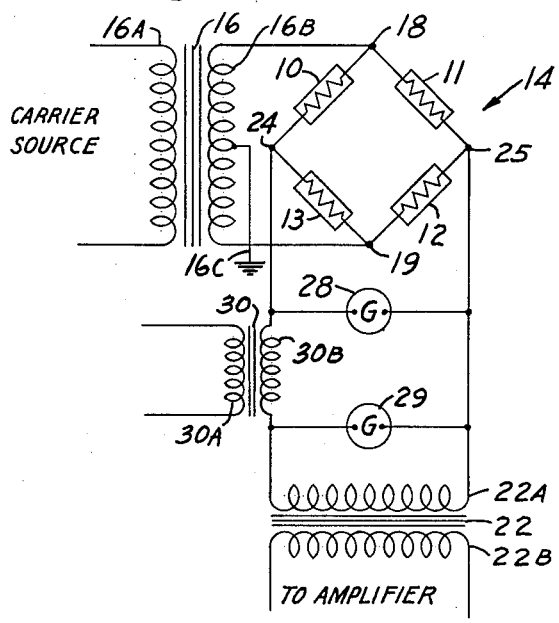
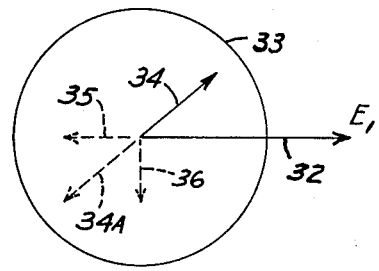
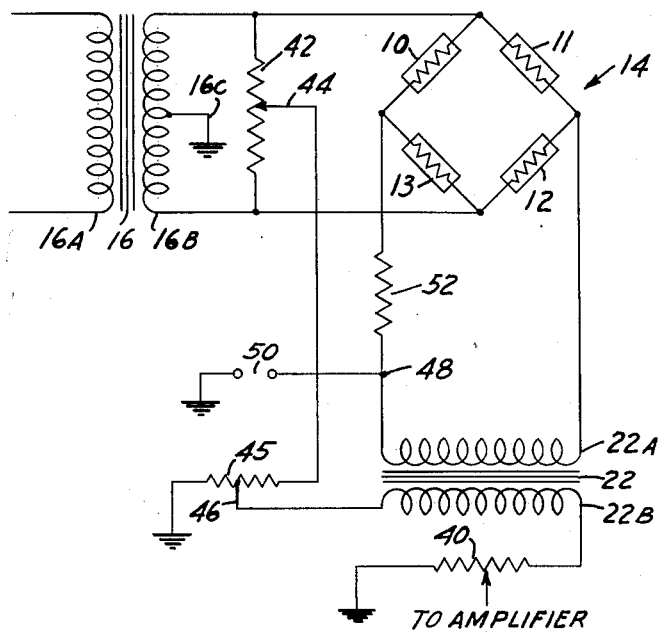
INVENTOR,
ROBERT L. SINK,
BY
James B. Christie
ATTORNEY.

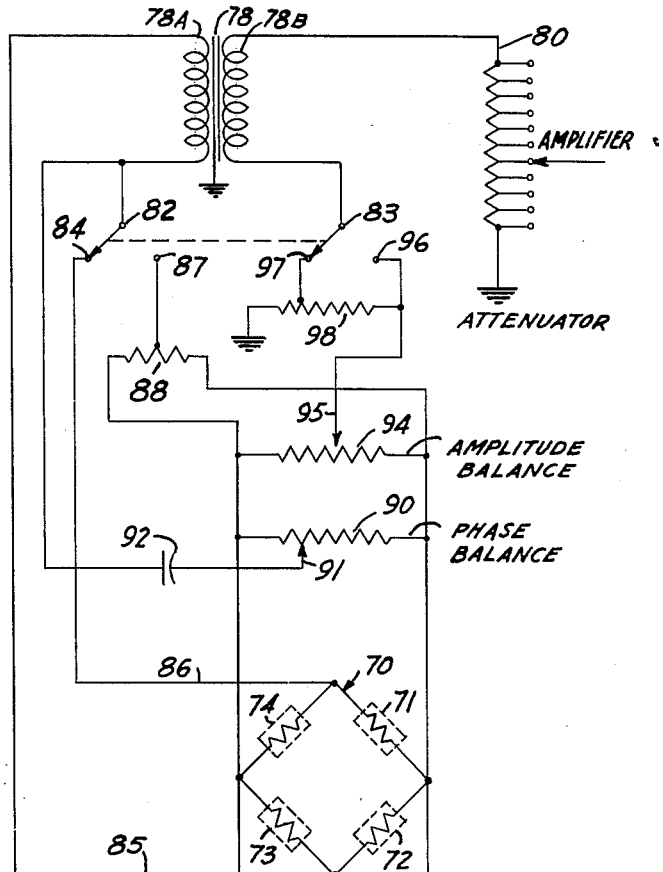
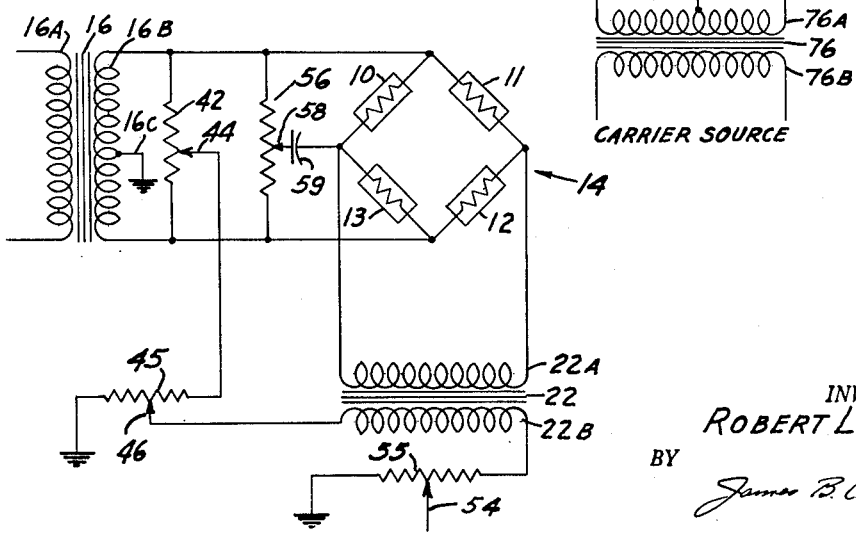

Patented Oct. 27, 1953

2,657,352

UNITED STATES PATENT OFFICE 2,657,352

BRIDGE CIRCUIT

Robert L. Sink, Altadena, Calif., assignor to Consolidated Engineering Corporation, Pasadena, Calif., a corporation of California Application July 11, 1949, Serial No. 104,029

6 Claims. (Cl. 323—75)

This invention relates to electrical bridge circuits and more particularly to improved methods and apparatus for balancing such bridge circuits.

The familiar example of an electrical bridge is the Wheatstone bridge which includes four resistors connected in a closed loop, a current source connected across one pair of opposite terminals of the loop and a galvanometer connected across the other pair of opposite terminals. If the value of one of the resistors is unknown, it may be determined in accordance with Kirchhoff's network laws by adjustment of the other three resistors to known values to produce a null galvanometer reading. Electrical bridges similar in principle to the Wheatstone bridge, i. e. based on Kirchhoff's network laws are widely used in scientific research and in industrial applications.

One common use of such a bridge network is in mechanical analysis wherein one or more of the bridge elements are in the form of strain gauges, accelerometer, or other impedance devices, the impedance of which vary in proportion to some function of stress, strain, vibration, etc. A bridge circuit of this character is generally employed in conjunction with a carrier type amplifier system wherein the "output" of the bridge constitutes the input to the amplifier.

Where it is desired to detect small changes in the impedance of one or more of the bridge elements responsive to a change in a physical function to be measured, it is essential that the input to the carrier-amplifier be at zero voltage for "at rest" conditions of the bridge impedances. For example, if one bridge impedance is a resistor type strain gauge, it is necessary that the amplifier input be zero voltage when the strain gauge is at rest or undistorted. For this reason, it is necessary for a bridge network to include balancing means to achieve a zero voltage input to the amplifier. The usual type of bridge balance circuit comprises two independent controls known as the phase balance and the resistance balance operable to adjust the bridge to a zero voltage output for at rest conditions of the bridge impedances. It is common experience that adjustment of one of these controls generally disturbs the previously attained null adjustment of the other. As a consequence, a great many alternate adjustments are required to arrive progressively at a condition where both phase and resistance balance are achieved. Hence the common reference to this type of control as "sliding zero."

I have now found that the input to a carrier amplifier from a bridge network can be adjusted with greater facility than has been heretofore possible by injection of a "balancing" voltage in series with the residual unbalance voltage of the bridge. In one form of the invention, the characteristics of the bridge itself are not altered and the injected voltage includes components which in amplitude and phase balance the input to the amplifier for the at rest condition of the bridge impedance. In another form of the invention, the bridge output is balanced with respect to phase by conventional phase balancing means and amplitude balance is achieved by "voltage injection." In either case, effective balance is achieved much more rapidly and with fewer manipulations than with the sliding zero type balancing network.

The residual unbalance of a bridge network comprises a vector voltage which may be broken down into two components in quadrature with each other. By synthetizing a balancing voltage of the correct phase and amplitude and injecting it in series with the bridge output, the residual unbalance of the bridge is compensated. Since the injection voltage comprises a vector sum of two voltages in quadrature, the amplitude of each can be independently adjusted without affecting the other.

Accordingly, the present invention contemplates the method of nullifying undesired output of a bridge circuit which comprises introducing a first voltage component to the output of the bridge, introducing a second voltage component in quadrature with the first component and adjusting the amplitude of the two voltage components so that the vector sum of the two components is equal in amplitude and 180° out of phase with the undesired output voltage. The invention also contemplates the method of nullifying undesirable output of a bridge circuit which comprises phase balancing the bridge in a conventional manner and introducing a voltage to the bridge output of such amplitude and phase as to compensate for the residual unbalance of the bridge.

Various means may be used for injecting the balancing voltage in accordance with the method outlined above. One such means includes a transformer with the secondary thereof connected in series with the output of the bridge and means for supplying a balancing voltage comprising two components in quadrature to the primary of the transformer.

The invention will be more clearly understood from the following detailed description thereof taken in conjunction with the accompanying drawing in which:

Fig. 1 is a circuit diagram in accordance with one embodiment of the invention;

Fig. 1A is a vector diagram illustrating the principle of the invention as applied to the circuit of Fig. 1;

Fig. 2 is a circuit diagram of another embodiment of the invention;

Fig. 3 is a circuit diagram in accordance with the invention wherein phase balance is obtained in a conventional manner; and Fig. 4 is a circuit diagram of a commercial bridge circuit for use in strain analysis, vibration analysis, etc.

Referring to Fig. 1, the circuit includes, as conventional elements, impedances 10, 11, 12, 13 arranged in separate legs of a bridge circuit 14. One or more of the impedances may consist of active elements such as strain gauges, accelerometers etc. The remaining impedances, if any, may be simple resistors. A transformer 16 feeds a carrier current to the bridge network. Secondary winding 16B of the transformer is connected across one pair of opposite terminals 18, 19 of the bridge, and primary winding 16A of the transformer is connected to a source (not shown) of carrier current. A second transformer 22 has its primary winding 22A connected across the other pair of opposite terminals 24, 25 of the bridge and a secondary 22B connected to a carrier amplifier (not shown). Two galvanometers 28, 29 are connected across the bridge output. The galvanometers 28, 29 are not conventional elements of a bridge circuit since bridge balance is generally determined from amplifier output. The galvanometers are included in the illustrated circuit of Fig. 1 for the purpose of facilitating explanation of the invention. A third transformer 30 has its secondary 30B connected in series with the bridge output and its primary 30A connected to a voltage source network (not shown).

Referring to Fig. 1A arrow 32 represents the reference voltage $E_1$ which is impressed across the bridge by the carrier transformer 16. Useful bridge circuits have a practical maximum unbalance represented in the diagram of Fig. 1A by the circle 33. Assume the unbalance voltage of bridge 14 to be represented by the arrow 34, this voltage for example being approximately 35° out of phase with reference voltage $E_1$. The unbalance voltage 34 will appear across galvanometer 28. To balance the output of the bridge as appearing across the secondary of transformer 22 by voltage injection, it is necessary to inject through transformer 30 a voltage having a phase and amplitude represented by vector 34A in Fig. 1A. The vector 34A may be broken down into components 35 and 36. The component 35 being 180° out of phase with the reference voltage $E_1$ and the component 36 being in quadrature with the component 35. The voltage component 35 may be considered to be in phase with the carrier input voltage although actually it may be either in phase or 180° out of phase with center tap 16C of the carrier transformer. By separately adjusting the amplitude of the voltage components 35 and 36 a vector sum represented by the vector 34A may be injected into the bridge output through transformer 30. When this has been accomplished, galvanometer 29 connected across the bridge output between injecting transformer 30 and output transformer 22 will show a null reading although galvanometer 28 still registers the unbalance voltage 34.

A modified type of circuit is shown in Fig. 2 wherein the same bridge 14 including impedances 10, 11, 12, and 13 are connected across the secondary 16B of transformer 16. The primary winding 16A of input transformer 16 is connected to a carrier source (not shown). The output of the bridge is connected across primary 22A of output transformer 22. The secondary 22B of the output transformer feeds an amplifier (not shown) through a slide wire 40. In the embodiment shown in Fig. 2, the in phase voltage component represented by the vector 35 in Fig. 1A is obtained from the input to the bridge by tapping a resistor 42 connected across the secondary 16B of transformer 16. Tap 44 is connected through a slide wire 45 and to ground. A voltage of proper amplitude is tapped off of slide wire 45 by means of an adjustable tap 46 and is fed directly to secondary 22B of transformer 22. The quadrature voltage component represented by the vector 36 in Fig. 1A is introduced directly to the output of the bridge at 48 from a source 50. The direct injection of the quadrature voltage necessitates inclusion of an isolation resistor 52 in series between the bridge and the point of injection 48. The quadrature voltage may be obtained from an independent source but is preferably obtained by tapping the carrier input through a suitable phase shift network.

Still another modification of the circuit is illustrated in Fig. 3 wherein, as before, bridge 14 is connected across the secondary 16B of a carrier input transformer 16 and across primary 22A of output transformer 22. An in phase voltage is injected into the secondary of transformer 22 in the same manner as shown in Fig. 2, i. e. by means of slidewire 42 connected across secondary 16B of input transformer 16, an adjustable tap 44 leading to slide wire 45 and its tap 46 connected to the secondary 22B of transformer 22. The input to the amplifier is obtained from a tap 54 on a slide wire 55 connected to the secondary 22B of the transformer. In the embodiment shown in Fig. 3 phase balance is obtained in much the same manner as in the conventional sliding zero balancing system. A resistor 56 is connected across the input to the bridge and an adjustable tap 58 is connected through a capacitor 59 to one of the bridge terminals. By moving tap 58 along resistor 56, the capacitance of arms 10 and 13 of the bridge may be adjusted so that the voltage output of the bridge in the at rest condition of the bridge impedances will be in phase with the signal. The modification shown in Fig. 3 results in a form of "sliding zero" although the circuit is still much more easily balanced than the conventional sliding zero circuit. The use of a phase balance separate from the voltage injection is desirable in some cases particularly in multiple channel applications to avoid mutual coupling between channels through a common source of quadrature voltage.

Fig. 4 shows a commercial circuit embodying the principles of my invention. The circuit includes a bridge network 70 including four impedance elements 71, 72, 73, 74 connected across secondary 76A of an input transformer 76. The primary 76B of transformer 76 is connected to a carrier source (not shown). The bridge is also connected across an output transformer 78 through the primary 78A thereof. The secondary 78B of transformer 78 is connected across an attenuator from which the input to an amplifier (not shown) is obtained.

The circuit is arranged so that the bridge 70 may include either two or four external active impedance elements and includes switches 82, 83 for switching the circuit from a four external impedance element bridge to a two external impedance element bridge. Thus, one side of bridge 70 is connected through lead 85 to primary 78A of transformer 78. The opposite terminal of the bridge is connected through lead 86 to terminal 84. When switch 82 contacts terminal 84 all four of the bridge impedances are in the circuit. When the switch contacts terminal 87, arms 71, 74 of bridge 70 are out of the circuit and a resistor 88, connected by center tap to terminal 87, replaces these two arms of the bridge.

A phase balance resistor 90 is connected across the input of the bridge. An adjustable tap 91 connects resistor 90 through capacitor 92 to switch 82, i. e. to the terminal between impedances 73, 74 of bridge 70 or to the center point of resistor 88 depending upon the positioning of switch 82. The phase balance network including resistor 90 and capacitor 92 is identical to the phase balance network of Fig. 3.

An amplitude balance resistor 94 is connected across the input of the bridge. An adjustable tap 95 connects slide wire 94 to two terminals 96, 97 of switch 83. Switch 97 is connected to the center tap 95 in series with a slide wire 98. Switch 83 is connected to one side of secondary 78B of transformer 78 so that the amplitude balance voltage tapped from resistor 94 is fed either through terminal 96 or terminal 97 of switch 83 directly into the amplifier input. Resistor 98 permits a change in the magnitude of the amplitude balance voltage injected into the secondary 78B of transformer 78. As illustrated, switches 82 and 83 are ganged so that with a four element bridge switch 83 is connected to terminal 97 and with a two active element bridge switch 83 is connected to terminal 96. To balance a bridge having two external active elements normally requires an amplitude balance voltage of greater magnitude than that required to balance a bridge of four active elements since the impedance elements for a two element bridge are generally inductive in character and have both greater output and greater unbalance signals than the resistance gauges. Hence, when switch 82 is connected through terminal 87 to the mid point of resistor 88, i. e. when bridge 70 includes only two active impedance elements, switch 83 is connected to terminal 96 and the full voltage tapped from resistor 94 is applied to secondary 78B of transformer 78. When switch 82 is in the position shown, i. e. when bridge 70 includes four active impedance elements, switch 83 connects terminal 97 and the amplitude balance voltage tapped from resistor 94 is reduced by slide wire 98.

The circuit of Fig. 4 is flexible in its adaptability to two or four active impedance elements. When resistance strain gauges are used, it is common practice to use four external bridge arms. When inductive type pickups are used, only the two external bridge arms are used. The commercial unit illustrated in Fig. 4 may be employed interchangeably in either application by appropriate manipulation of switches 82, 83.

I have shown a number of circuits wherein the method of my invention may be carried out. These circuits are not exclusive means for accomplishing this purpose since innumerable modifications may be employed to obtain an injection voltage adapted to balance the input to a carrier amplifier obtained from a bridge network wherein the impedance elements of the bridge are in an "at rest" condition. Such modifications are included within the contemplation of this invention as described and claimed.

I claim:

1. In a bridge circuit having four impedance elements arranged in connecting arms, an input transformer connected across one pair of opposite bridge terminals to impress a carrier current across the bridge and an output transformer connected across the opposite pair of bridge terminals, means for nullifying unbalance output voltage of the bridge comprising means for adjusting the impedance relationship within the bridge so that said unbalance voltage will be in phase with said carrier current, and means for injecting in the bridge output a voltage of the same frequency as the carrier signal and 180° out of phase with the unbalance output voltage of the bridge developed responsive to the application of the carried signal thereto and means for adjusting the magnitude of the injected voltage to equal the magnitude of said output voltage.

2. A bridge circuit comprising four impedance elements arranged in connecting arms, an input transformer having its secondary connected across one pair of opposite bridge terminals to impress a carrier current across the bridge, an output transformer having its primary connected across the opposite pair of bridge terminals, means grounding the center point of the secondary of said input transformer, a slidewire resistor connected across said secondary and means for injecting in the bridge output and circuit a voltage derived from said slidewire of the same frequency as but 180° out of phase with respect to the carrier current which is impressed across the bridge.

3. Apparatus according to claim 2 wherein said means for injecting said voltage comprises a second slidewire connected between the tap of said slidewire resistor and ground, the tap of said second slidewire being connected to the secondary of said output transformer.

4. In a bridge circuit comprising four impedance elements arranged in connecting arms, an input transformer having its secondary winding connected across one pair of opposite bridge terminals for applying an alternating current signal across the bridge, a first resistance connected across the secondary winding of the transformer and having an adjustable tap, a second resistance connected between the adjustable tap on the first resistance and a tap on the secondary winding of the input transformer, means connecting a portion of the second resistance in series with the output circuit of the bridge, and means for causing unbalance signals in the output circuit of the bridge to be substantially in phase with respect to the alternating current signal which is applied across the bridge circuit.

5. The apparatus of claim 4 wherein the last-named means comprises auxiliary impedances coupled to the bridge circuit for adjusting the phase of unbalance signals produced in the output circuit of the bridge.

6. The apparatus of claim 4 wherein the last-named means comprises means for impressing in series with the output circuit of the bridge an alternating current signal of adjustable amplitude and of the same frequency as but in phase quadrature with respect to the alternating current signal which is applied across the bridge circuit.

ROBERT L. SINK.

References Cited in the file of this patent

UNITED STATES PATENTS

| Number | Name | Date |
|---|---|---|
| 1,665,397 | Wunsch | Apr. 10, 1928 |
| 2,008,857 | Flanders | July 23, 1935 |
| 2,444,676 | Roberts et al. | July 6, 1948 |
| 2,463,252 | Doll | Mar. 1, 1949 |
| 2,471,105 | Gustafsson et al. | May 24, 1949 |

FOREIGN PATENTS

| Number | Country | Date |
|---|---|---|
| 559,105 | Great Britain | Feb. 3, 1944 |